United States Patent
Kwak et al.

(10) Patent No.: US 9,905,850 B2
(45) Date of Patent: Feb. 27, 2018

(54) POLYCRYSTALLINE LITHIUM MANGANESE OXIDE PARTICLES, PREPARATION METHOD THEREOF, AND CATHODE ACTIVE MATERIAL INCLUDING THE SAME

(71) Applicant: LG Chem, Ltd., Seoul (KR)

(72) Inventors: Ick Soon Kwak, Daejeon (KR); Seung Beom Cho, Daejeon (KR); Hwa Seok Chae, Daejeon (KR)

(73) Assignee: LG Chem, Ltd. (KR)

( * ) Notice: Subject to any disclaimer, the term of this patent is extended or adjusted under 35 U.S.C. 154(b) by 238 days.

(21) Appl. No.: 14/514,788

(22) Filed: Oct. 15, 2014

(65) Prior Publication Data
US 2015/0030927 A1 Jan. 29, 2015

Related U.S. Application Data

(63) Continuation of application No. PCT/KR2014/006841, filed on Jul. 25, 2014.

(30) Foreign Application Priority Data

Jul. 26, 2013 (KR) .................. 10-2013-0089071

(51) Int. Cl.
*H01M 4/505* (2010.01)
*H01M 10/052* (2010.01)
*C01G 45/12* (2006.01)

(52) U.S. Cl.
CPC ........ *H01M 4/505* (2013.01); *C01G 45/1214* (2013.01); *C01G 45/1221* (2013.01);
(Continued)

(58) Field of Classification Search
CPC ........... H01M 10/0525; H01M 4/0402; H01M 4/0471; H01M 4/131; H01M 4/366;
(Continued)

(56) References Cited

U.S. PATENT DOCUMENTS 5,478,674 A * 12/1995 Miyasaka ............. H01M 4/485
429/223
5,783,328 A 7/1998 Wang
(Continued)

FOREIGN PATENT DOCUMENTS

CN 1228620 A 9/1999
CN 1461066 A 12/2003
(Continued)

OTHER PUBLICATIONS

Machine Translation of: KR 1999-0071411A, Kwon et al., Oct. 14, 1998.*
(Continued)

*Primary Examiner* — Kenneth J Douyette
(74) *Attorney, Agent, or Firm* — Lerner, David, Littenberg, Krumholz & Mentlik, LLP

(57) ABSTRACT

Provided are polycrystalline lithium manganese oxide particles represented by Chemical Formula 1 and a method of preparing the same:

$$Li_{(1+x)}Mn_{(2-x-y-f)}Al_yM_fO_{(4-z)} \quad \text{<Chemical Formula 1>}$$

where M is sodium (Na), or two or more mixed elements including Na, $0 \leq x \leq 0.2$, $0 < y \leq 0.2$, $0 < f \leq 0.2$, and $0 \leq z \leq 0.2$. According to an embodiment of the present invention, limitations, such as the Jahn-Teller distortion and the dissolution of $Mn^{2+}$, may be addressed by structurally stabilizing the polycrystalline lithium manganese oxide particles. Thus, life characteristics and charge and discharge capacity characteristics of a secondary battery may be improved.

24 Claims, 2 Drawing Sheets

(52) U.S. Cl.
CPC ...... *C01P 2002/54* (2013.01); *C01P 2002/72* (2013.01); *C01P 2002/74* (2013.01); *C01P 2004/03* (2013.01); *C01P 2004/61* (2013.01); *C01P 2006/12* (2013.01); *C01P 2006/40* (2013.01); *H01M 10/052* (2013.01); *H01M 2220/20* (2013.01); *Y02E 60/122* (2013.01)

(58) Field of Classification Search
CPC ..... H01M 4/485; H01M 4/505; C01B 35/128; C01G 45/00; C01G 45/1214
See application file for complete search history.

(56) References Cited

U.S. PATENT DOCUMENTS

| | | | |
|---|---|---|---|
| 6,165,647 A * | 12/2000 | Watanabe | H01M 4/525 |
| | | | 429/220 |
| 6,248,477 B1 | 6/2001 | Howard, Jr. et al. | |
| 6,303,250 B1 * | 10/2001 | Watanabe | H01M 4/505 |
| | | | 429/303 |
| 6,413,673 B1 * | 7/2002 | Kasai | C01G 45/1242 |
| | | | 429/218.1 |
| 6,465,130 B1 * | 10/2002 | Numata | H01M 4/505 |
| | | | 429/224 |
| 6,531,220 B1 | 3/2003 | Kweon et al. | |
| 6,706,446 B2 | 3/2004 | Nakai et al. | |
| 6,730,435 B1 | 5/2004 | Nakane et al. | |
| 2001/0016285 A1 | 8/2001 | Cho et al. | |
| 2002/0006550 A1 | 1/2002 | Yang et al. | |
| 2002/0055042 A1 | 5/2002 | Kweon et al. | |
| 2002/0061444 A1 | 5/2002 | Kweon et al. | |
| 2002/0071990 A1 | 6/2002 | Kweon et al. | |
| 2002/0081494 A1 * | 6/2002 | Kondo | C01G 45/1242 |
| | | | 429/224 |
| 2002/0110736 A1 | 8/2002 | Kweon et al. | |
| 2002/0119372 A1 | 8/2002 | Zhang | |
| 2003/0082452 A1 | 5/2003 | Ueda et al. | |
| 2003/0087155 A1 | 5/2003 | Cho et al. | |
| 2004/0013941 A1 | 1/2004 | Kobayashi et al. | |
| 2004/0202938 A1 * | 10/2004 | Noguchi | C01G 45/1242 |
| | | | 429/231.95 |
| 2005/0042514 A1 | 2/2005 | Sun et al. | |
| 2005/0123832 A1 | 6/2005 | Tsukuma et al. | |
| 2005/0260496 A1 | 11/2005 | Ueda et al. | |
| 2006/0194114 A1 | 8/2006 | Saito | |
| 2006/0222947 A1 * | 10/2006 | Sun | C01G 53/006 |
| | | | 429/231.1 |
| 2009/0087362 A1 | 4/2009 | Sun et al. | |
| 2009/0253025 A1 | 10/2009 | Whitacre | |
| 2009/0286164 A1 * | 11/2009 | Wada | H01M 4/131 |
| | | | 429/338 |
| 2010/0104944 A1 | 4/2010 | Saito et al. | |
| 2010/0112448 A1 | 5/2010 | Yu et al. | |
| 2010/0243952 A1 | 9/2010 | Kumada et al. | |
| 2010/0288969 A1 | 11/2010 | Koga et al. | |
| 2010/0327221 A1 | 12/2010 | Koga et al. | |
| 2011/0001094 A1 | 1/2011 | Hashiba et al. | |
| 2011/0210287 A1 | 9/2011 | Koga et al. | |
| 2011/0223483 A1 | 9/2011 | Koga et al. | |
| 2011/0269018 A1 * | 11/2011 | Kono | C01G 45/1228 |
| | | | 429/217 |
| 2011/0287319 A1 | 11/2011 | Vogler et al. | |
| 2012/0137508 A1 | 6/2012 | Oladeji | |
| 2012/0177994 A1 | 7/2012 | Kim et al. | |
| 2013/0115513 A1 | 5/2013 | Choi et al. | |
| 2013/0327978 A1 | 12/2013 | Ko et al. | |

FOREIGN PATENT DOCUMENTS

| | | | |
|---|---|---|---|
| CN | 1633394 | A | 6/2005 |
| CN | 1773753 | A | 5/2006 |
| CN | 1263182 | C | 7/2006 |
| CN | 101855754 | A | 10/2010 |
| CN | 101887972 | A | 11/2010 |
| CN | 101958157 | A | 1/2011 |
| CN | 102593456 | A | 7/2012 |
| EP | 1491504 | A1 | 12/2004 |
| EP | 2139058 | A1 | 12/2009 |
| EP | 2590246 | A1 | 5/2013 |
| JP | H09265984 | A | 10/1997 |
| JP | H11-176441 | A | 7/1999 |
| JP | H11317230 | A | 11/1999 |
| JP | 2000100433 | A | 4/2000 |
| JP | 2000-133266 | A | 5/2000 |
| JP | 2000-215891 | A | 8/2000 |
| JP | 2001043860 | A | 2/2001 |
| JP | 2001122628 | A | 5/2001 |
| JP | 2001-196063 | A | 7/2001 |
| JP | 2002083631 | A | 3/2002 |
| JP | 2002124262 | A | 4/2002 |
| JP | 2002158011 | A | 5/2002 |
| JP | 2003178759 | A | 6/2003 |
| JP | 2004083388 | A | 3/2004 |
| JP | 2005510017 | A | 4/2005 |
| JP | 2006236886 | A | 9/2006 |
| JP | 2007294119 | A | 11/2007 |
| JP | 4197054 | B2 | 12/2008 |
| JP | 2009152214 | | 7/2009 |
| JP | 2009176732 | A | 8/2009 |
| JP | 2010095439 | A | 4/2010 |
| JP | 2010097947 | A | 4/2010 |
| JP | 2010137996 | A | 6/2010 |
| JP | 2011-519122 | A | 6/2011 |
| JP | 2011525470 | A | 9/2011 |
| JP | 2011216214 | A | 10/2011 |
| JP | 4827931 | B2 | 11/2011 |
| JP | 2012096949 | | 5/2012 |
| JP | 2012116746 | A | 6/2012 |
| JP | 2012146662 | A | 8/2012 |
| JP | 2014-512638 | A | 5/2014 |
| KR | 1999/0071411 | A1 * | 10/1998 ............... H01M 4/48 |
| KR | 100261120 | B1 | 7/2000 |
| KR | 2001-0091887 | A | 10/2001 |
| KR | 2002-0024521 | A | 3/2002 |
| KR | 2002-0064367 | | 8/2002 |
| KR | 2002-0087627 | A | 11/2002 |
| KR | 2002-0092936 | A | 12/2002 |
| KR | 2005-0049746 | A | 5/2005 |
| KR | 100565990 | B1 | 3/2006 |
| KR | 2006-0109305 | A | 10/2006 |
| KR | 2009-0103133 | A | 10/2009 |
| KR | 2011-0036897 | A | 4/2011 |
| KR | 2011-0044936 | A | 5/2011 |
| KR | 2011-0061565 | A | 6/2011 |
| KR | 20110076905 | A | 7/2011 |
| KR | 2011-0108566 | A | 10/2011 |
| KR | 2011-0111058 | A | 10/2011 |
| KR | 2012-0081808 | A | 7/2012 |
| KR | 10-1272042 | B1 | 6/2013 |
| TW | 201008879 | A | 3/2010 |

OTHER PUBLICATIONS

International Search Report from PCT/KR2014/006841, dated Nov. 5, 2014.
International Search Report from PCT/KR2014/006844, dated Nov. 5, 2014.
International Search Report from PCT/KR2014/006843, dated Nov. 5, 2014.
Extended Search Report from European Application No. 14829443.2, dated Dec. 2, 2015.
Halil Sahan et al., "The effect of LBO coating method on electrochemical performance of LiMn2O4 cathode material," Sold State Ionics 178, 35-36, 2008, pp. 1837-42 (Feb. 15, 2008).
European Search Report for Application No. 14827145.5 dated Apr. 30, 2015.
U.S. Appl. No. 14/515,036, filed Oct. 15, 2014.
U.S. Appl. No. 14/514,987, filed Oct. 15, 2014.
Extended Search Report from European Application No. 14814673.1, dated Apr. 14, 2016.
International Search Report for Application No. PCT/KR2014/006839 dated Nov. 5, 2014.

(56) References Cited

OTHER PUBLICATIONS

Du, K., et al., "Synthesis and electrochemical performance of layered lithium-sodium manganese oxide as a cathode material for lithium ion batteries." Journal of Power Sources, Apr. 19, 2013, vol. 238, pp. 372-375.
"Zero-Strain Intercalation Cathode for Rechargeable Li-Ion Cell", Cho et al., Agnew Chem Int ed. 40(18), 3367-3369, Sep. 17, 2001.

* cited by examiner

POLYCRYSTALLINE LITHIUM MANGANESE OXIDE PARTICLES, PREPARATION METHOD THEREOF, AND CATHODE ACTIVE MATERIAL INCLUDING THE SAME

CROSS-REFERENCE TO RELATED APPLICATIONS

The present application is a continuation of International Application No. PCT/KR2014/006841 filed Jul. 25, 2014, which claims priority from Korean Application No. 10-2013-0089071 filed Jul. 26, 2013, the disclosures of which are hereby incorporated herein by reference.

TECHNICAL FIELD

The present invention relates to polycrystalline lithium manganese oxide particles, a preparation method thereof, and a cathode active material for a lithium secondary battery including the polycrystalline lithium manganese oxide particles.

BACKGROUND ART

In line with growing concerns about environmental issues, research into electric vehicles and hybrid electric vehicles which may replace vehicles using fossil fuels such as gasoline vehicles and diesel vehicles, one of major causes of air pollution, has been conducted.

Research into the use of lithium secondary batteries having high energy density as power sources of the electric vehicles and hybrid electric vehicles has been actively conducted, and some of the research are in a commercialization stage.

Lithium cobalt oxide ($LiCoO_2$) is mainly used as a cathode active material of the lithium secondary batteries, and in addition, the uses of lithium manganese oxides, such as $LiMnO_2$ having a layered crystal structure and $LiMn_2O_4$ having a spinel crystal structure, and lithium nickel oxide ($LiNiO_2$) are also in consideration.

Among these materials, lithium manganese oxides, such as $LiMn_2O_4$, have advantages in that thermal stabilities are excellent and the prices are relatively low, but may have limitations in that capacities are low, cycle characteristics are poor, and high-temperature characteristics are poor.

When considering the structure of $LiMn_2O_4$, lithium (Li) ions are located at tetrahedral sites (8a), manganese (Mn) ions ($Mn^{3+}/Mn^{4+}$) are located at octahedral sites (16d), and $O^{2-}$ ions are located at octahedral sites (16c). These ions form a cubic close-packed arrangement. The 8a tetrahedral sites share faces with the 16c octahedral sites having vacancies therearound to form three-dimensional channels, thereby providing the channels through which $Li^+$ ions are easily move.

In particular, the biggest limitation of $LiMn_2O_4$ is that the capacity decreases as the number of cycles increases. This is due to a structural change known as the "Jahn-Teller distortion", that is, a phase transition from cubic to tetragonal caused by changes in the oxidation number of Mn ion at the end of discharge (near 3 V). Also, the cause of the capacity fading may include a phenomenon of dissolution of manganese into an electrolyte solution.

In order to address these limitations, a significant amount of research into a method of excessively adding Li in an amount of 1.01 to 1.1 times the stoichiometric amount of Li to stoichiometric $LiMn_2O_4$ to prevent the site exchange between Li and Mn metal ions and a method of substituting Mn sites with transition metals or divalent and trivalent cations to control the oxidation number of Mn ion or prevent the phase transition from cubic to tetragonal has been conducted.

These methods may reduce the capacity fading in comparison to that of the stoichiometric $LiMn_2O_4$, but may not address the limitations such as the Jahn-Teller distortion and the dissolution of $Mn^{2+}$.

PRIOR ART DOCUMENTS

Patent Document

Korean Patent Application Laid-Open Publication No. 10-2011-0076905

DISCLOSURE OF THE INVENTION

Technical Problem

An aspect of the present invention provides polycrystalline lithium manganese oxide particles capable of improving life characteristics and charge and discharge capacity characteristics of a secondary battery by addressing limitations such as the Jahn-Teller distortion and the dissolution of $Mn^{2+}$.

Another aspect of the present invention provides a method of preparing the polycrystalline lithium manganese oxide particles, in which secondary battery characteristics better than those of lithium manganese oxide prepared by a wet method may not only be obtained by a dry method with low production costs, but also crystals may be easily grown at low temperature and a non-uniform reaction during dry mixing may be minimized.

Another aspect of the present invention provides a cathode active material and a cathode which include the polycrystalline lithium manganese oxide particles.

Another aspect of the present invention provides a lithium secondary battery including the cathode.

Technical Solution

According to an aspect of the present invention, there is provided polycrystalline lithium manganese oxide particles represented by Chemical Formula 1:

$$Li_{(1+x)}Mn_{(2-x-y-f)}Al_yM_fO_{(4-z)} \qquad \text{<Chemical Formula 1>}$$

where M is sodium (Na), or two or more mixed elements including Na, $0 \le x \le 0.2$, $0 < y \le 0.2$, $0 < f \le 0.2$, and $0 \le z \le 0.2$.

According to another aspect of the present invention, there is provided a method of preparing polycrystalline lithium manganese oxide particles represented by Chemical Formula 1 including: (i) obtaining a precursor mixture including a polycrystalline manganese precursor, a lithium precursor, and a sintering aid; and (ii) sintering the precursor mixture obtained in step (i).

According to another aspect of the present invention, there is provided a cathode active material including the polycrystalline lithium manganese oxide particles.

According to another aspect of the present invention, there is provided a cathode including the cathode active material.

According to another aspect of the present invention, there is provided a lithium secondary battery including the cathode.

Advantageous Effects

According to an embodiment of the present invention, since limitations, such as the Jahn-Teller distortion and the dissolution of $Mn^{2+}$, may be addressed by structurally stabilizing the polycrystalline lithium manganese oxide particles, life characteristics and charge and discharge capacity characteristics of a secondary battery may be improved.

Also, according to a preparation method according to an embodiment of the present invention, since crystals of the polycrystalline lithium manganese oxide particles may be easily grown at low temperature and a non-uniform reaction during dry mixing may be minimized by adding a small amount of a sintering aid and using a dry method with low production costs, a secondary battery having excellent battery characteristics may be provided.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Polycrystalline lithium manganese oxide particles according to an embodiment of the present invention may be represented by a compound of Chemical Formula 1 below:

      $Li_{(1+x)}Mn_{(2-x-y-f)}Al_yM_fO_{(4-z)}$              <Chemical Formula 1> where M is sodium (Na), or two or more mixed elements including Na, $0 \leq x \leq 0.2$, $0 < y \leq 0.2$, $0 < f \leq 0.2$, and $0 \leq z \leq 0.2$.

In this case, when z in Chemical Formula 1 is not 0, the compound may include oxygen vacancies. In the present invention, it is desirable that Z=0, because that there is no oxygen vacancy is advantageous for the formation of a stable layered structure.

In general, spinel-structured $LiMn_2O_4$ has limitations such as the possibility of the fast diffusion of lithium ions due to its structural characteristics of having a lithium movement path, high capacity but the instability of an electrolyte in a high voltage range, the Jahn-Teller distortion of $Mn^{3+}$ during heavy discharge, and the dissolution of manganese ions ($Mn^{2+}$) during discharge.

Specifically, in $LiMn_2O_4$, $Mn^{3+}$ relatively increases in comparison to $Mn^{4+}$ under the condition in which lithium ions are insufficient in the lattice or under heavy discharge conditions. As a result, the distortion of the structure occurs, and a phase transition from cubic to tetragonal occurs due to the changes in the oxidation number of Mn ions during continuous charge and discharge caused by the increase in unstable $Mn^{3+}$. Eventually, the reversibility of the structure may be reduced.

Also, the dissolution of Mn ions eventually causes capacity fading while unstable $Mn^{3+}$ changes to $Mn^{2+}$ and $Mn^{4+}$ on the surface of an electrode through an exchange reaction between the $Mn^{3+}$ ions, the generated $Mn^{2+}$ ions are dissolved in an acidic electrolyte to decrease the amount of an active material, and the dissolved $Mn^{2+}$ ions are precipitated as metal at an anode to obstruct the movement of lithium ions. Thus, the dissolution of Mn ions may reduce the life characteristics of a secondary battery.

Important factors of the spinel-structured $LiMn_2O_4$ that determine characteristics as a cathode active material may include size, shape, structure, and chemical composition of $LiMn_2O_4$ particles.

Figure 1:
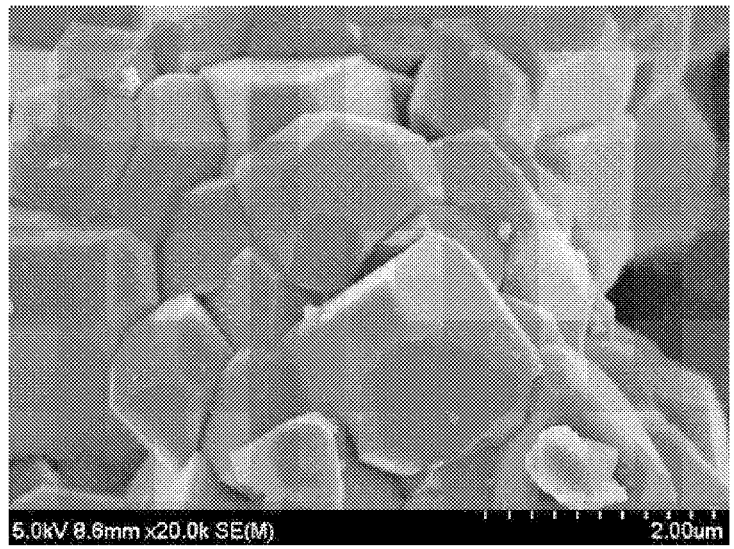
FIG. 1 illustrates a cross-sectional scanning electron microscope (SEM) image of polycrystalline lithium manganese oxide particles prepared in Example 1 of the present invention.

According to an embodiment of the present invention, the polycrystalline lithium manganese oxide particles represented by Chemical Formula 1 may improve the life characteristics and charge and discharge capacity characteristics of the secondary battery by having curved round edges, in which the edges (corner portions) of the lithium manganese oxide are more obtuse than edges of typical lithium manganese oxide as illustrated in FIG. 1, and minimizing the Jahn-Teller distortion and the dissolution of $Mn^{2+}$ because the polycrystalline lithium manganese oxide particles are structurally stable.

In the polycrystalline lithium manganese oxide particles according to the embodiment of the present invention, the term "polycrystal" denotes a crystal composed of two or more crystal particles having an average crystal diameter of 152 nm to 300 nm, preferably 155 nm to 250 nm, and most preferably 150 nm to 210 nm.

Also, in the present specification, the crystal particles constituting the polycrystal may denote primary particles. The polycrystal may denote a form of a secondary particle in which the primary particles are agglomerated, and may be a spherical or nearly spherical polycrystal.

In the polycrystalline lithium manganese oxide particles according to the embodiment of the present invention, an average particle diameter ($D_{50}$) of the secondary particle, in which the primary particles are agglomerated, may be in a range of 5 μm to 20 μm. In the case that the average particle diameter of the secondary particle is less than 5 μm, the stability of the polycrystalline lithium manganese oxide particles may be reduced, and in the case in which the average particle diameter of the secondary particle is greater than 20 μm, the output characteristics of the secondary battery may be reduced.

In the present invention, the average particle diameter ($D_{50}$) of the particles may be defined as a particle diameter at 50% in a cumulative particle diameter distribution. The average particle diameter ($D_{50}$) of the particles according to the embodiment of the present invention, for example, may be measured by using a laser diffraction method. The laser diffraction method may generally measure a particle diameter ranging from a submicron level to a few mm, and may obtain highly repeatable and high resolution results.

A method of measuring the average particle diameter ($D_{50}$) of the polycrystalline lithium manganese oxide particles according to an embodiment of the present invention, for example, may be performed in such a manner that the polycrystalline lithium manganese oxide particles are dispersed in a solution, the solution is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle diameter distribution of the measurement instrument may then be calculated.

Also, according to an embodiment of the present invention, an average crystal diameter of the primary particles of the polycrystalline lithium manganese oxide particles may be quantitatively analyzed using X-ray diffraction analysis. For example, the polycrystalline lithium manganese oxide particles are put in a holder and diffraction data obtained by irradiating the particles with X-ray are analyzed so that the average crystal diameter of the primary particles may be quantitatively analyzed.

The polycrystalline lithium manganese oxide particles according to the embodiment of the present invention have a form in which a part of manganese sites in a spinel lithium manganese oxide is substituted with aluminum (Al) and M (where M is Na, or two or more mixed elements including Na).

In Chemical Formula 1, f, a content of M that may substitute the part of the manganese sites, satisfies $0<f\leq0.2$, and may satisfy $0.001\leq f\leq0.03$. Also, in Chemical Formula 1, the mixed element may further include any one selected from the group consisting of boron (B), cobalt (Co), vanadium (V), lanthanum (La), titanium (Ti), nickel (Ni), zirconium (Zr), yttrium (Y), and gallium (Ga), or two or more mixed elements thereof, and the mixed element, for example, may be Na, or a mixed element of Na and B. In the case that the element of M is Na, since the diffusion rate of Na in the form of $Na^{1+}$ ions may be high and the ionic radius of Na may be small, crystal growth may be facilitated even at low temperature. Thus, Na may contribute to stabilize the crystal structure.

In the case that f is 0, there may be difficulty in addressing the limitations such as the dissolution of $Mn^{2+}$ and the structural collapse due to the Jahn-Teller distortion, which are the desired effects of the present invention. In the case in which f is greater than 0.2, it is not desirable because degrees of agglomeration and fusion of the polycrystalline lithium manganese oxide particles may be increased and fine powder may occur during grinding.

According to an embodiment of the present invention, an amount of Na in the polycrystalline lithium manganese oxide particles is in a range of 700 ppm to 3,000 ppm, and may be in a range of 700 ppm to 1,400 ppm. In the case that the amount of Na is less than 700 ppm, there may be difficulty in addressing the limitations such as the dissolution of $Mn^{2+}$ and the structural collapse due to the Jahn-Teller distortion, which are the desired effects of the present invention. In the case in which the amount of Na is greater than 3,000 ppm, it is not desirable because the degrees of agglomeration and fusion of the polycrystalline lithium manganese oxide particles may be increased and fine powder may occur during grinding.

In X-ray diffraction analysis of the polycrystalline lithium manganese oxide particles according to the present invention, the polycrystalline lithium manganese oxide particles may have a structure in which (311), (400), and (440) planes are particularly grown with respect to a (111) plane.

Specifically, when a peak intensity ratio of I(111)/I(111) is defined as 100% in the X-ray diffraction analysis, I(311)/I (111) may be 40% or more, I(400)/I(111) may be 40% or more, and I(440)/I(111) may be 20% or more.

Also, according to an embodiment of the present invention, a full width at half maximum (FWHM) of a (311) peak of the polycrystalline lithium manganese oxide particles in X-ray diffraction analysis may be 0.3 degrees or less.

In the present invention, the FWHM quantifies a peak width at a half position of the (311) peak intensity which is obtained by the X-ray diffraction of the polycrystalline lithium manganese oxide particles.

The FWHM may be represented as degrees (°), i.e., the unit of 2θ, and the higher the crystallinity of the polycrystalline lithium manganese oxide particles is, the lower the value of the FWHM is.

Also, a Brunauer-Emmett-Teller (BET) specific surface area of the polycrystalline lithium manganese oxide particles according to the embodiment of the present invention may be 0.5 $m^2$/g or less. In the case that the BET specific surface area is greater than 0.5 $m^2$/g, the output characteristics of the secondary battery may be reduced.

According to an embodiment of the present invention, the specific surface area of the polycrystalline lithium manganese oxide particles may be measured by a BET method. For example, the specific surface area may be measured by a 6-point BET method according to a nitrogen gas adsorption-flow method using a porosimetry analyzer (Belsorp-II mini by Bell Japan Inc.).

Also, the present invention provides a method of preparing the polycrystalline lithium manganese oxide particles.

According to an embodiment of the present invention, provided is the method of preparing the polycrystalline lithium manganese oxide particles represented by Chemical Formula 1 including: (i) obtaining a precursor mixture including a polycrystalline manganese precursor, a lithium precursor, and a sintering aid; and (ii) sintering the precursor mixture obtained in step (i).

According to an embodiment of the present invention, a dry method with low production costs may be used to easily prepare polycrystalline lithium manganese oxide particles having better performance than those prepared by a wet method. In particular, since a sintering aid may be added, crystals may be easily grown at low temperature and a non-uniform reaction during dry mixing may be minimized.

The sintering aid usable according to an embodiment of the present invention is an additive for crystal growth, and is not particularly limited so long as it is a material that may promote the crystal growth of the polycrystalline lithium manganese oxide particles.

The sintering aid has an effect of forming edges (corner portions) of the polycrystalline lithium manganese oxide particles into a curved round shape by blunting the edges thereof. In the polycrystalline lithium manganese oxide particles, the dissolution of manganese may occur from the edges of the particles, and characteristics, in particular, high-temperature life characteristics, of the secondary battery may be reduced due to the dissolution of manganese.

Thus, according to the preparation method according the embodiment of the present invention, a dissolution area of manganese may be reduced by forming the edges of the polycrystalline lithium manganese oxide particles into curved round edges, and as a result, the stability and life characteristics of the secondary battery may be improved.

The sintering aid usable according to the embodiment of the present invention may include at least one mixture including a sodium compound. As the mixture, any one selected from the group consisting of a boron compound, a cobalt compound, a vanadium compound, a lanthanum compound, a zirconium compound, an yttrium compound, and a gallium compound, or a mixture of two or more thereof may be used together with the sodium compound.

The sodium compound, or a mixture of the sodium compound and the boron compound may be used as the sintering aid.

Sodium carbonate, sodium silicate, sodium hydroxide, or a mixture of two or more thereof may be used as the sodium compound.

Any one selected from the group consisting of boron, lithium tetraborate, boron oxide, and ammonium borate, or a mixture of two or more thereof may be used as the boron compound.

Any one selected from the group consisting of cobalt oxide (II), cobalt oxide (III), cobalt oxide (IV), and tricobalt tetraoxide, or a mixture of two or more thereof may be used as the cobalt compound.

Vanadium oxide, lanthanum oxide, yttrium oxide, or gallium oxide may be respectively used as the vanadium compound, the lanthanum compound, the yttrium compound, and the gallium compound.

Any one selected from the group consisting of zirconium boride, calcium zirconium silicate, and zirconium oxide, or a mixture of two or more thereof may be used as the zirconium compound.

The sintering aid may be used in an amount of 0.2 parts by weight to 2 parts by weight, for example, 0.4 parts by weight to 1.4 parts by weight based on a total weight of the polycrystalline manganese precursor. In the case that the amount of the sintering aid is less than 0.2 parts by weight, there may be difficulty in addressing the limitations such as the dissolution of $Mn^{2+}$ and the structural collapse due to the Jahn-Teller distortion, which are the desired effects of the present invention. In the case in which the amount of the sintering aid is greater than 2 parts by weight, it is not desirable because the degrees of agglomeration and fusion of the polycrystalline lithium manganese oxide particles may be increased and fine powder may occur during grinding.

Also, according to an embodiment of the present invention, an average particle diameter ($D_{50}$) of the polycrystalline manganese precursor may significantly affect the structural stability of the polycrystalline lithium manganese oxide particles and the performance characteristics of the secondary battery.

The polycrystalline manganese precursor usable according to an embodiment of the present invention may have the form of a polycrystal which is in the form of a secondary particle formed by the agglomeration of primary particles having an average crystal diameter of 100 nm to 300 nm, for example, 100 nm to 200 nm. In the polycrystalline manganese precursor, the definition of the term "polycrystal" may be the same as the definition in the polycrystalline lithium manganese oxide.

The average particle diameter ($D_{50}$) of the secondary particle as the polycrystalline manganese precursor may be in a range of 9 μm to 25 μm, for example, 9 μm to 15 μm. Since the particle diameter of the polycrystalline manganese precursor having the above range of the average particle diameter is large, tap density may be high and BET specific surface area may decrease. Accordingly, reactivity with respect to the electrolyte solution may decrease, and thus, the life characteristics of the secondary battery may be improved.

Also, in the manganese precursor according to the embodiment of the present invention, a fine and low-crystalline aluminum compound may exist in the state of being uniformly mixed with the manganese precursor. Al may be included in the manganese precursor in an amount of 0.01 wt % to 10 wt %, for example, 0.05 wt % to 5 wt % based on the total weight of the manganese precursor. The polycrystalline manganese precursor including Al may include $(Mn_{(1-y)}Al_y)_3O_4$ (0<y≤0.2).

Specifically, the polycrystalline manganese precursor including Al may be formed by coprecipitating an aluminum compound and any one selected from the group consisting of $MnCO_3$, $Mn_3O_4$, $MnSO_4$, and $Mn_2O_3$, or a mixture of two or more thereof using a coprecipitation method, and thus, the polycrystalline manganese precursor including Al may be obtained in the form of secondary particles in which two or more primary particles are agglomerated.

For example, distilled water and aqueous ammonia solution are put in a coprecipitation reactor and the mixture may then be stirred by supplying air into the reactor. Next, a manganese aluminum compound aqueous solution including any one selected from the group consisting of $MnCO_3$, $Mn_3O_4$, $MnSO_4$, and $Mn_2O_3$, or a mixture of two or more thereof, and an aluminum compound (e.g., $AlSO_4$) at an appropriate molar ratio, an aqueous ammonia solution as a complexing agent, and an alkaline aqueous solution as a pH adjuster are continuously added to the reactor and then mixed together. Then, a polycrystalline manganese compound $(Mn_{(1-y)}Al_y)_3O_4$ (0<y≤0.2) containing Al may be prepared by introducing $N_2$ into the reactor.

The aluminum compound may include any one selected from the group consisting of $AlSO_4$, $AlCl$, and $AlNO_3$, or a mixture of two or more thereof, but the present invention is not limited thereto.

In the preparation method of the polycrystalline lithium manganese oxide particles, the sintering, for example, may be performed in a temperature range of 700° C. to 1,000° C. for about 2 hours to about 12 hours.

The lithium precursor may be any one selected from the group consisting of lithium chloride (LiCl), lithium carbonate ($LiCO_3$), lithium hydroxide (LiOH), lithium phosphate ($Li_3PO_4$), and lithium nitrate ($LiNO_3$), or a mixture of two or more thereof.

Also, the present invention provides a cathode active material including the polycrystalline lithium manganese oxide particles.

Furthermore, the present invention provides a cathode including the cathode active material.

The cathode may be prepared according to a typical method known in the art. For example, a binder, a conductive agent, and a dispersant, if necessary, as well as a solvent are mixed with a cathode active material and stirred to prepare a slurry, and a metal current collector is then coated with the slurry and pressed. Thereafter, the cathode may be prepared by drying the metal current collector.

Any metal may be used as the metal current collector so long as it is a metal having high conductivity as well as no reactivity in a voltage range of the battery to which the slurry of the electrode active material may be easily adhered. Non-limiting examples of the cathode current collector may include aluminum, nickel, or a foil prepared by a combination thereof.

An organic solvent, such as N-methylpyrrolidone (NMP), dimethylformamide (DMF), acetone, and dimethylacetamide, or water may be used as the solvent for forming the cathode. These solvents may be used alone or in a mixture of two or more thereof. An amount of the solvent used may be sufficient if the solvent may dissolve and disperse the cathode active material, the binder, and the conductive agent in consideration of a coating thickness of the slurry and manufacturing yield.

Various types of binder polymers, such as a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, poly (acrylic acid), polymers in which hydrogens thereof are substituted with lithium (Li), sodium (Na), or calcium (Ca), or various copolymers, may be used as the binder.

Any conductive agent may be used without particular limitation so long as it has suitable conductivity without causing adverse chemical changes in the batteries. For example, the conductive agent may include a conductive material such as: graphite such as natural graphite and artificial graphite; carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives.

An aqueous-based dispersant or an organic dispersant, such as N-methyl-2-pyrrolidone, may be used as the dispersant.

Also, the present invention provides a secondary battery including the cathode, an anode, and a separator disposed between the cathode and the anode.

A carbon material, lithium metal, silicon, or tin, which may intercalate and deintercalate lithium ions, may be typically used as an anode active material that is used in the anode according to an embodiment of the present invention. For example, the carbon material may be used and both low crystalline carbon and high crystalline carbon may be used as the carbon material. Typical examples of the low crystalline carbon may be soft carbon and hard carbon, and typical examples of the high crystalline carbon may be natural graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Furthermore, the anode collector is generally fabricated to have a thickness of 3 µm to 500 µm. The anode collector is not particularly limited so long as it has conductivity without causing adverse chemical changes in the batteries. The anode collector may be formed of, for example, copper, stainless steel, aluminum, nickel, titanium, fired carbon, copper or stainless steel that is surface-treated with one of carbon, nickel, titanium, silver, or the like, an aluminum-cadmium alloy, or the like. Also, like the cathode collector, the anode collector may have a fine roughness surface to improve bonding strength of an anode active material. The anode collector may have various shapes such as a film, a sheet, a foil, a net, a porous body, a foam body, a non-woven fabric body, and the like.

Similar to the cathode, a binder and a conductive agent, which are typically used in the art, may be used in the anode. An anode active material and the above additives are mixed and stirred to prepare an anode active material slurry. Then, a current collector is coated therewith and pressed to prepare the anode.

Also, a typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used. However, the present invention is not limited thereto.

A lithium salt, which may be included as the electrolyte used in the present invention, may be used without limitation so long as it is typically used in an electrolyte for a lithium secondary battery. For example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_2CF_2SO_2)_2N^-$ may be used as an anion of the lithium salt.

The electrolyte used in the present invention may include an organic liquid electrolyte, an inorganic liquid electrolyte, a solid polymer electrolyte, a gel-type polymer electrolyte, a solid inorganic electrolyte, and a molten inorganic electrolyte, which may be used in the preparation of a lithium secondary battery. However, the present invention is not limited thereto.

A shape of the lithium secondary battery of the present invention is not particularly limited, and for example, a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Preferred examples of the medium and large sized device may be an electric vehicle, a hybrid electric vehicle, a plug-in hybrid electric vehicle, or a power storage system, but the medium and large sized device is not limited thereto.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Hereinafter, the present invention will be described in more detail, according to examples and experimental examples. However, the present invention is not limited thereto.

Preparation of Polycrystalline Lithium Manganese Oxide Particles

Example 1

37.50 g of $Li_2CO_3$, 141.88 g of $(Mn_{0.95}Al_{0.05})_3O_4$ having an average particle diameter of 10 µm, 0.62 g (0.01 mol) of $Na_2CO_3$ as a sintering aid were put in a mixer (Waring blender) and mixed at a speed of the center of the mixer of 18,000 rpm for 1 minute. The mixed powder was put in a 500 cc alumina crucible and sintered at about 800° C. for 4 hours in an air atmosphere. A cake obtained after the sintering was ground in a mortar and then classified using a 400 mesh sieve to obtain $Li_{1.09}Mn_{1.80}Al_{0.1}Na_{0.01}O_4$. The $Li_{1.09}Mn_{1.80}Al_{0.1}Na_{0.01}O_4$ was secondary particles composed of two or more crystal particles (primary particles) having a crystal diameter of 200 nm, wherein an average particle diameter of the secondary particle was 1.05 μm.

Also, since the $(Mn_{0.95}Al_{0.05})_3O_4$ having an average particle diameter of 10 μm was prepared by coprecipitating $MnSO_4$ as a manganese precursor and $AlSO_4$ using a coprecipitation method, the $(Mn_{0.95}Al_{0.05})_3O_4$ may be in the form of secondary particles in which two or more primary particles were agglomerated. About 2.1 wt % of Al was included in the $(Mn_{0.95}Al_{0.05})_3O_4$.

Specifically, $MnSO_4$ and $AlSO_4$ were mixed at a ratio of 98:2, and $MnSO_4 \cdot 7H_2O$ including 2M $AlSO_4$ was then prepared using distilled water subjected to $N_2$ purging. The prepared $MnSO_4 \cdot 7H_2O$ was introduced into a continuous stirred tank reactor (CSTR, CSTR-L0, EMS Tech) at a rate of 250 mL/h.

A pH value of the solution was maintained to be 10.5 using a pH meter and a controller while introducing a 40% sodium hydroxide aqueous solution as an alkalizing agent at a rate of 230 mL/h to 250 mL/h through a sodium hydroxide aqueous solution supply unit of the reactor and a 25% ammonia solution at a rate of 30 mL/h through an ammonia solution supply unit of the reactor. A temperature of the reactor was set to be 40° C., a retention time (RT) was controlled to be 10 hours, and stirring was performed at a speed of 1,200 rpm to precipitate (coprecipitate) as $Mn_3O_4$ including Al.

The reaction solution thus obtained was filtered through a filter and purified with distilled water. Then, an additional process of drying was performed to prepare $(Mn_{0.95}Al_{0.05})_3O_4$ including Al.

Example 2

$Li_{1.09}Mn_{1.80}Al_{0.1}Na_{0.01}O_4$ was obtained in the same manner as in Example 1 except that an amount of $Na_2CO_3$ used was 1.24 g (0.02 mol) instead of 0.62 g (0.01 mol).

Comparative Example 1

$Li_{1.09}Mn_{1.81}Al_{0.1}O_4$ was obtained in the same manner as in Example 1 except that $Na_2CO_3$ as a sintering aid was not added.

Comparative Example 2

$Li_{1.09}Mn_{1.81}Al_{0.1}O_4$ was obtained in the same manner as in Example 1 except that $(Mn_{0.95}Al_{0.05})_3O_4$ having an average particle diameter of 5 μm was used instead of $(Mn_{0.95}Al_{0.05})_3O_4$ having an average particle diameter of 10 μm, and $Na_2CO_3$ as a sintering aid was not added.

Comparative Example 3

$Li_{1.09}Mn_{1.80}Al_{0.1}Na_{0.01}O_4$ was obtained in the same manner as in Example 1 except that $(Mn_{0.95}Al_{0.05})_3O_4$ having an average particle diameter of 5 μm was used instead of $(Mn_{0.95}Al_{0.05})_3O_4$ having an average particle diameter of 10 μm.

Comparative Example 4

$Li_{1.09}Mn_{1.9}Na_{0.01}O_4$ was obtained in the same manner as in Example 1 except that single crystal $Mn_3O_4$ was used as a manganese precursor instead of using polycrystalline $(Mn_{0.95}Al_{0.05})_3O_4$.

The $Li_{1.09}Mn_{1.9}Na_{0.01}O_4$ was in the form of primary particles and a particle diameter thereof was 10 μm.

Preparation of Lithium Secondary Battery

Example 3

Cathode Preparation

The polycrystalline lithium manganese oxide particles prepared in Example 1 were used as a cathode active material.

A cathode mixture slurry was prepared by adding 94 wt % of the cathode active material, 3 wt % of carbon black as a conductive agent, and 3 wt % of polyvinylidene fluoride (PVdF) as a binder to N-methyl-2-pyrrolidone (NMP) as a solvent. An about 20 μm thick aluminum (Al) thin film as a cathode collector was coated with the cathode mixture slurry and dried, and the Al thin film was then roll-pressed to prepare a cathode.

Anode Preparation

An anode active material slurry was prepared by mixing 96.3 wt % of carbon powder as an anode active material, 1.0 wt % of super-p as a conductive agent, and 1.5 wt % of styrene-butadiene rubber (SBR) and 1.2 wt % of carboxymethyl cellulose (CMC) as a binder, and adding the mixture to NMP as a solvent. A 10 μm thick copper (Cu) thin film as an anode collector was coated with the anode active material slurry and dried, and the Cu thin film was then roll-pressed to prepare an anode.

Non-Aqueous Electrolyte Solution Preparation

A 1 M $LiPF_6$ non-aqueous electrolyte solution was prepared by adding $LiPF_6$ to a non-aqueous electrolyte solvent that was prepared by mixing ethylene carbonate and diethyl carbonate, as an electrolyte, at a volume ratio of 30:70.

Lithium Secondary Battery Preparation

A mixed separator of polyethylene and polypropylene was disposed between the cathode and anode thus prepared, and a polymer type battery was then prepared by a typical method. Then, the preparation of each lithium secondary battery was completed by injecting the prepared non-aqueous electrolyte solution.

Example 4

A lithium secondary battery was prepared in the same manner as in Example 3 except that the polycrystalline lithium manganese oxide particles prepared in Example 2 were used as a cathode active material.

Comparative Examples 5 to 8

Lithium secondary batteries were prepared in the same manner as in Example 3 except that the lithium manganese oxide particles prepared in Comparative Examples 1 to 4 were respectively used as a cathode active material.

Experimental Example 1

Scanning Electron Microscope (SEM) Image

Figure 2:
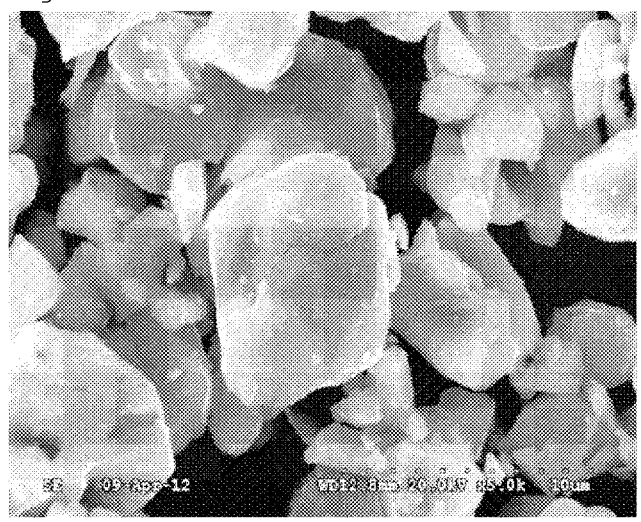
FIG. 2 illustrates a cross-sectional SEM image of lithium manganese oxide particles prepared in Comparative Example 4.

SEM images were respectively obtained from the polycrystalline lithium manganese oxide particles prepared in Example 1 and the lithium manganese oxide particles prepared in Comparative Example 4, and the results thereof are presented in FIGS. 1 and 2, respectively.

As illustrated in FIG. 1, since the sintering aid and the polycrystalline manganese precursor having a specific size were used during the preparation of the polycrystalline lithium manganese oxide particles, polycrystalline lithium manganese oxide particles having curved round edges may be obtained.

As illustrated in FIG. 2, the lithium manganese oxide particles of Comparative Example 4 using single crystal $Mn_3O_4$ had round edges (corners) due to the use of the sintering aid, but it may be understood that the shape and size of the particles were non-uniform. Also, it may be confirmed that Comparative Example 4, different from Example 1, was in the form of primary particles instead of the form of secondary particles in which primary particles were agglomerated.

Experimental Example 2

X-Ray Diffraction Analysis

X-ray diffraction analysis (D4 Endeavor, Bruker) was performed on the polycrystalline lithium manganese oxide particles prepared in Examples 1 and 2 and Comparative Examples 1 to 3. The results thereof are presented in Table 1 and FIG. 3 below.

TABLE 1

|  | (111)/(111) | (311)/(111) | (400)/(111) | (440)/(111) |
|---|---|---|---|---|
| Example 1 | 100.0 | 49.9 | 48.2 | 29.7 |
| Example 2 | 100.0 | 48.8 | 46.1 | 29.9 |
| Comparative Example 1 | 100.0 | 34.4 | 14.7 | 15.0 |
| Comparative Example 2 | 100.0 | 32.1 | 14.0 | 14.5 |
| Comparative Example 3 | 100.0 | 48.1 | 46.2 | 29.1 |

Figure 3:
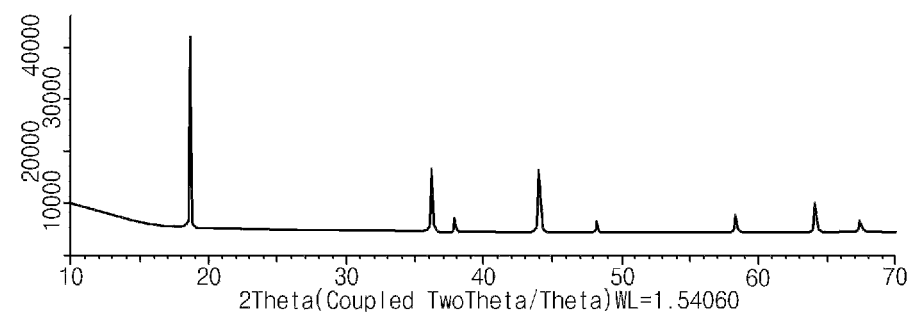
FIG. 3 is the results of X-ray diffraction analysis of the polycrystalline lithium manganese oxide particles prepared in Example 1 of the present invention.

As illustrated in Table 1 and FIG. 3, in the X-ray diffraction analysis of the polycrystalline lithium manganese oxide particles prepared in Examples 1 and 2, it may be identified that the polycrystalline lithium manganese oxide particles may have a structure in which (311), (400), and (440) planes were particularly grown with respect to a (111) plane.

Specifically, when the peak intensity ratios of I(111)/I(111) of Examples 1 and 2 were determined as 100% in the X-ray diffraction analysis, I(311)/I(111) was 47% or more, I(400)/I(111) was 46% or more, and I(440)/I(111) was 29% or more.

In contrast, with respect to Comparative Examples 1 and 2, when the peak intensity ratio of I(111)/I(111) was determined as 100%, I(311)/I(111) was in a range of about 32% to about 35%, I(400)/I(111) was in a range of about 14% to about 14.7%, and I(440)/I(111) was in a range of about 14% to about 15%, and thus, it may be confirmed that crystallinities were decreased by 20% to 60% in comparison to Examples 1 and 2. In particular, it may be confirmed that the peak intensity ratios of I(400)/I(111) of Examples 1 and 2 were significantly increased by 3 times or more that of Comparative Example 1.

Also, with respect to Comparative Example 3, when the peak intensity ratio of I(111)/I(111) was determined as 100%, I(311)/I(111) was about 48.1%, I(400)/I(111) was about 46.2%, and I(440)/I(111) was about 29.1%, and thus, it may be confirmed that although crystallinity was improved in comparison to those of Comparative Examples 1 and 2, the crystallinity was decreased in comparison to those of Examples 1 and 2.

Experimental Example 3

Electrochemical Experiments

The lithium secondary batteries (battery capacity: 3.4 mAh) prepared in Examples 3 and 4 and Comparative Examples 5 to 8 were charged at a constant current (CC) of 2 C under constant current/constant voltage (CC/CV) conditions, and thereafter, charge in the first cycle was performed by charging the lithium secondary batteries at a constant voltage (CV) to a current of 0.17 mAh. After the batteries were left standing for 20 minutes, discharge capacities in the first cycle were measured by discharging the batteries at a constant current of 0.1 C to a voltage of 10 mV. Subsequently, with respect to each battery, the charge and discharge were repeated to measure capacity, and the results thereof are presented in Table 2 below.

TABLE 2

| Category | Example 3 | Example 4 | Comparative Example 5 | Comparative Example 6 | Comparative Example 7 | Comparative Example 8 |
|---|---|---|---|---|---|---|
| Charge capacity [mAh/g] | 108.42 | 107.20 | 105.72 | 85.4 | 106.90 | 105.1 |
| Discharge capacity [mAh/g] | 106.71 | 105.61 | 103.30 | 84.4 | 104.8 | 103.2 |
| $1^{st}$ efficiency [%] | 98.42 | 98.52 | 97.71 | 98.8 | 98.0 | 98.2 |
| C-rate [2.0 C/0.1 C] | 98.91 | 98.52 | 98.06 | 99.4 | 98.9 | 97.12 |

As illustrated in Table 2, it may be confirmed that Examples 3 and 4, in which the sintering aids were added, had better charge and discharge capacity characteristics and efficiency characteristics than Comparative Examples 5 and 6.

Thus, the structural stability and performance characteristics of the polycrystalline lithium manganese oxide particles may be affected by whether the sintering aid was added or not. In particular, it may be confirmed that an initial capacity value may be improved by increasing the crystal size of the polycrystalline lithium manganese oxide particles.

That is, the crystal growth of the polycrystalline lithium manganese oxide particles may be promoted by the addition of the sintering aid, and the edges of the particles were also formed in a round shape without sharp edges. Thus, it may be estimated that the dissolution area of manganese may be reduced to improve the life characteristics and capacity characteristics.

However, even if the sintering aid was added, it may confirmed that, with respect to the secondary batteries of Examples 3 and 4 using the manganese precursor having an average particle diameter of 10 μm, the charge and discharge efficiencies were significantly better than that of Comparative Example 7 using the manganese precursor having an average particle diameter of 5 μm.

In this case, since the particle diameter of the manganese precursor was large, the specific surface area may decrease to reduce the reactivity with respect to the electrolyte solution. Thus, it may be estimated that the life characteristics and initial capacity characteristics of the batteries according to C-rate may be improved.

Experimental Example 4

Crystal Size Measurement

Crystal diameters of the polycrystalline lithium manganese oxide particles of Examples 1 and 2 and Comparative Examples 1 to 3 were measured by X-ray diffraction (XRD) analysis.

Specifically, about 5 g of the polycrystalline lithium manganese oxide particles of Examples 1 and 2 and Comparative Examples 1 to 3 were respectively put in a holder and the crystal diameter may be calculated by analyzing diffraction data obtained by irradiating the particles with X-ray.

The crystal diameter may be calculated from a full width at half maximum of a main peak or three or more peaks, and the crystal diameter may correspond to an average crystal diameter of the primary particles of the polycrystalline lithium manganese oxide particles. The average crystal diameters of the primary particles of the polycrystalline lithium manganese oxide particles according to the above results are presented in Table 3 below.

TABLE 3

| Category | Example 1 | Example 2 | Comparative Example 1 | Comparative Example 2 | Comparative Example 3 |
|---|---|---|---|---|---|
| Crystal diameter (nm) | 200 | 198 | 120 | 115 | 130 |

As illustrated in Table 3, the average crystal diameter of the primary particles of the polycrystalline lithium manganese oxide particles, in which $Na_2CO_3$ was added as a sintering aid, was about 198 nm or more.

In contrast, with respect to Comparative Examples 1 and 2 in which $Na_2CO_3$ as a sintering aid was not added, the average crystal diameters were in a range of 115 nm to 120 nm, and it may be confirmed that the crystal diameters were decreased by about 30% to about 60% in comparison to Examples 1 and 2.

With respect to Comparative Example 3 in which the manganese precursor having a small average particle diameter was used even if the sintering aid was added, the average crystal diameter was 130 nm, and thus, it may be confirmed that the crystal diameter was decreased by about 50% or more.

INDUSTRIAL APPLICABILITY

In the case that the polycrystalline lithium manganese oxide particles according to an embodiment of the present invention are used in a lithium secondary battery, limitations, such as the Jahn-Teller distortion and the dissolution of $Mn^{2+}$, may be addressed. Thus, life characteristics and charge and discharge capacity characteristics of the secondary battery may be improved.

The invention claimed is:

1. Polycrystalline lithium manganese oxide particles represented by Chemical Formula 1:

$$Li_{(1+x)}Mn_{(2-x-y-f)}Al_yNa_fO_{(4-z)}$$ <Chemical Formula 1> where $0 \leq x \leq 0.2$, $0 < y \leq 0.2$, $0 < f \leq 0.2$, and $0 \leq z \leq 0.2$,
wherein the polycrystalline lithium manganese oxide particles are in a form of secondary particles in which two or more primary particles having an average crystal diameter of 152 nm to 300 nm are agglomerated.

2. The polycrystalline lithium manganese oxide particles of claim 1, wherein, in Chemical Formula 1, f satisfies $0.001 \leq f \leq 0.03$.

3. The polycrystalline lithium manganese oxide particles of claim 1, wherein an average particle diameter ($D_{50}$) of the secondary particle is in a range of 5 μm to 20 μm.

4. The polycrystalline lithium manganese oxide particles of claim 1, wherein an amount of Na in the polycrystalline lithium manganese oxide particles is in a range of 700 ppm to 3,000 ppm.

5. The polycrystalline lithium manganese oxide particles of claim 1, wherein I(311)/I(111) of the lithium manganese oxide particles is 40% or more when a peak intensity ratio of I(111)/I(111) is defined as 100% in X-ray diffraction analysis.

6. The polycrystalline lithium manganese oxide particles of claim 1, wherein I(400)/I(111) and I(440)/I(111) of the lithium manganese oxide particles are respectively 40% or more and 20% or more when a peak intensity ratio of I(111)/I(111) is defined as 100% in X-ray diffraction analysis.

7. The polycrystalline lithium manganese oxide particles of claim 1, wherein a full width at half maximum (FWHM) of a (311) peak of the lithium manganese oxide particles in X-ray diffraction analysis is 0.3 degrees or less.

8. The polycrystalline lithium manganese oxide particles of claim 1, wherein a Brunauer-Emmett-Teller (BET) specific surface area of the lithium manganese oxide particles is 0.5 m²/g or less.

9. A cathode active material comprising the polycrystalline lithium manganese oxide particles of claim 1.

10. A cathode comprising the cathode active material of claim 9.

11. A lithium secondary battery comprising the cathode of claim 10.

12. The polycrystalline lithium manganese oxide particles of claim 1, wherein the polycrystalline lithium manganese oxide particles have curved round edges.

13. A method of preparing polycrystalline lithium manganese oxide particles represented by Chemical Formula 1 comprising:

(i) obtaining a precursor mixture including a polycrystalline manganese precursor, a lithium precursor, and a sintering aid; and
(ii) sintering the precursor mixture obtained in step (i), $$Li_{(1+x)}Mn_{(2-y-f)}Al_yNa_fO_{(4-z)}$$ <Chemical Formula 1> where 0≤x≤0.2, 0<y≤0.2, 0<f≤0.2, and 0≤z≤0.2,
wherein the sintering aid is a sodium compound, and
the polycrystalline lithium manganese oxide particles are in a form of secondary particles in which two or more primary particles having an average crystal diameter of 152 nm to 300 nm are agglomerated.

14. The method of claim 13, wherein an average particle diameter ($D_{50}$) of the secondary particle is in a range of 9 μm to 25 μm.

15. The method of claim 13, wherein the average particle diameter ($D_{50}$) of the secondary particle is in a range of 9 μm to 15 μm.

16. The method of claim 13, wherein the polycrystalline manganese precursor comprises aluminum (Al) in an amount of 0.01 wt % to 10 wt %.

17. The method of claim 16, wherein the polycrystalline manganese precursor comprises $(Mn_{(1-y)}Al_y)_3O_4$ (0<y≤0.2).

18. The method of claim 17, wherein the polycrystalline manganese precursor is formed by coprecipitating an aluminum compound and any one selected from the group consisting of $MnCO_3$, $Mn_3O_4$, $MnSO_4$, and $Mn_2O_3$, or a mixture of two or more thereof.

19. The method of claim 18, wherein the aluminum compound comprises any one selected from the group consisting of $AlSO_4$, $AlCl$, and $AlNO_3$, or a mixture of two or more thereof.

20. The method of claim 13, wherein the sodium compound comprises sodium carbonate, sodium silicate, sodium hydroxide, or a mixture of two or more thereof.

21. The method of claim 13, wherein the sintering aid is used in an amount of 0.2 parts by weight to 2 parts by weight based on a total weight of the polycrystalline manganese precursor.

22. The method of claim 13, wherein the sintering is performed in a temperature range of 700° C. to 1,000° C.

23. The method of claim 13, wherein the lithium precursor comprises any one selected from the group consisting of lithium chloride (LiCl), lithium carbonate ($LiCO_3$), lithium hydroxide (LiOH), lithium phosphate ($Li_3PO_4$), and lithium nitrate ($LiNO_3$), or a mixture of two or more thereof.

24. The method of claim 13, wherein the polycrystalline lithium manganese oxide particles have curved round edges.

* * * * *